(12) United States Patent
Ko et al.

(10) Patent No.: US 10,916,778 B2
(45) Date of Patent: Feb. 9, 2021

(54) SECONDARY BATTERY

(71) Applicant: Samsung SDI Co., Ltd., Yongin-si (KR)

(72) Inventors: Young San Ko, Yongin-si (KR); Min Jae Kim, Yongin-si (KR); Ki Jun Kim, Yongin-si (KR); Chae Woong Cho, Yongin-si (KR); Jun Sik Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 100 days.

(21) Appl. No.: 16/316,230

(22) PCT Filed: Jul. 17, 2017

(86) PCT No.: PCT/KR2017/007666
§ 371 (c)(1),
(2) Date: Jan. 8, 2019

(87) PCT Pub. No.: WO2018/026117
PCT Pub. Date: Feb. 8, 2018

(65) Prior Publication Data
US 2019/0237767 A1 Aug. 1, 2019

(30) Foreign Application Priority Data
Aug. 1, 2016 (KR) ........................ 10-2016-0097948

(51) Int. Cl.
*H01M 4/66* (2006.01)
*H01M 4/13* (2010.01)
(Continued)

(52) U.S. Cl.
CPC ............. *H01M 4/663* (2013.01); *H01M 2/26* (2013.01); *H01M 4/13* (2013.01); *H01M 4/667* (2013.01); *H01M 10/052* (2013.01); *H01M 10/42* (2013.01)

(58) Field of Classification Search
CPC .......... H01M 10/052; H01M 10/0525; H01M 10/42; H01M 2/26; H01M 4/13; H01M 4/139; H01M 4/663; H01M 4/667
See application file for complete search history.

(56) References Cited

U.S. PATENT DOCUMENTS 9,685,662 B2   6/2017 Katsura et al.
2013/0236782 A1* 9/2013 Ozaki .................. H01M 4/13
                                                    429/211

(Continued)

FOREIGN PATENT DOCUMENTS

JP   2013-110098 A   6/2013
JP   2013-127860 A   6/2013

(Continued)

OTHER PUBLICATIONS

International Search Report for corresponding International Application No. PCT/KR2017/007666, dated Sep. 29, 2017, 3pp.

*Primary Examiner* — Carlos Barcena
(74) *Attorney, Agent, or Firm* — Lewis Roca Rothgerber Christie LLP

(57) ABSTRACT

Disclosed is a secondary battery which can improve safety by forming a carbon coating layer and an electrode active material layer on an electrode plate such that ends of the carbon coating layer and the electrode active material layer are in different positions. As an example, the disclosed secondary battery comprises: an electrode assembly including a first electrode plate, a second electrode plate, and a separator interposed therebetween; and a case for receiving the electrode assembly, wherein the first electrode plate (Continued)

comprises: a first electrode collector; a carbon coating layer formed on at least one surface of the first electrode collector; and a first electrode active material layer covering at least a portion of the carbon coating layer, wherein the carbon coating layer and the electrode active material layer are formed such that the end of the carbon coating layer and the end of the first electrode active material layer are in different positions, and a protrusion is formed on at least one of the end of the carbon coating layer and the end of the first electrode active material layer.

8 Claims, 5 Drawing Sheets

(51) Int. Cl.
*H01M 10/052* (2010.01)
*H01M 10/42* (2006.01)
*H01M 2/26* (2006.01)

(56) References Cited

U.S. PATENT DOCUMENTS

| 2014/0287319 | A1 | 9/2014 | Katsura et al. |
| 2015/0147624 | A1* | 5/2015 | Yamafuku ......... H01M 10/0585 429/121 |

FOREIGN PATENT DOCUMENTS

| KR | 10-2006-0134339 A | 12/2006 |
| KR | 10-2008-0095980 A | 10/2008 |
| KR | 10-2012-0040223 A | 4/2012 |
| KR | 10-2012-0136102 A | 12/2012 |
| KR | 10-2014-0032624 A | 3/2014 |
| KR | 10-2014-0069850 A | 6/2014 |
| KR | 10-2015-0118304 A | 10/2015 |

* cited by examiner

SECONDARY BATTERY

CROSS-REFERENCE TO RELATED APPLICATION(S)

This application is a National Phase Patent Application of International Patent Application Number PCT/KR2017/007666, filed on Jul. 17, 2017, which claims priority of Korean Patent Application No. 10-2016-0097948, filed Aug. 1, 2016. The entire contents of both of which are incorporated herein by reference.

TECHNICAL FIELD

Embodiments of the present invention relate to a secondary battery.

BACKGROUND ART

Unlike a primary battery that cannot be charged, a secondary battery may be recharged. A low-capacity secondary battery comprised of one single battery cell is used as the power source for various portable small-sized electronic devices, such as cellular phones, and camcorders. A high-capacity secondary battery in which several tens of battery cells are connected in a battery pack is widely used as the power source for motor drives, such as those in hybrid electric vehicles.

The secondary battery is manufactured in various shapes, and representative shapes thereof include a cylindrical shape, a prismatic shape and a pouch shape. The secondary battery is configured such that an electrode assembly formed by positive and negative electrode plates with a separator as an insulator interposed therebetween, and an electrolyte, are received in a case, and a cap plate is coupled to the case. Of course, positive and negative electrode terminals are connected to the electrode assembly and then exposed or protruded to the outside of the case.

Technical Problems to be Solved

Embodiments of the present invention provide a secondary battery which can improve safety by forming a carbon coating layer and an electrode active material layer on an electrode plate such that ends of the carbon coating layer and the electrode active material layer are in different positions.

Technical Solutions

In accordance with an embodiment of the present invention, there is provided a secondary battery comprising an electrode assembly including a first electrode plate, a second electrode plate, and a separator interposed therebetween, and a case for receiving the electrode assembly, wherein the first electrode plate comprises: a first electrode collector; a carbon coating layer formed on at least one surface of the first electrode collector; and a first electrode active material layer covering at least a portion of the carbon coating layer, wherein the carbon coating layer and the electrode active material layer are formed such that the end of the carbon coating layer and the end of the first electrode active material layer are in different positions, and a protrusion is formed on at least one of the end of the carbon coating layer and the end of the first electrode active material layer.

Here, the first electrode active material layer may be formed to cover at least a portion of the first electrode collector.

In addition, the protrusion may include a first protrusion protruded from the end of the carbon coating layer in a thickness direction, and a second protrusion protruded from the end of the first electrode active material layer in a thickness direction.

In addition, the first electrode active material layer may be formed such that its end is extended longer than the end of the carbon coating layer.

In addition, the second protrusion may be positioned between the end the carbon coating layer and the end of the first electrode active material layer.

In addition, the carbon coating layer may be formed such that its end is extended longer than the end of the first electrode active material layer.

In addition, the first protrusion may be positioned between the end of the first electrode active material layer and the end of the carbon coating layer.

In addition, the end of the carbon coating layer and the end of the first electrode active material layer may be spaced a preset distance apart from each other.

In addition, the distance may be set to be in the range from 1 mm to 10 mm.

Advantageous Effects

As described above, in the secondary battery according to the embodiment of the present invention, the end of the carbon coating layer coated on an electrode plate and the end of the electrode active material layer are in different positions to prevent protrusions of the carbon coating layer and the electrode active material layer from overlapping each other, thereby suppressing defects of the secondary battery and improving the safety of the secondary battery. That is to say, the carbon coating layer and the electrode active material layer may be coated by, for example, but not limited to, slot die coating. Here, the protrusions formed on a coating start portion and/or a coating end portion in a thickness direction may be relatively thick. Therefore, if the ends of the carbon coating layer and the electrode active material layer respectively having the protrusions are in the same position, they may become thicker than prescribed thickness levels, so that the active material may be delaminated during a pressing step and/or lithium ions may be precipitated through the protrusions during a battery operation (charging or discharging). In the secondary battery according to the embodiment of the present invention, however, since the ends of the carbon coating layer and the electrode active material layer having the protrusions are in different positions, as described above, the delamination of the electrode active material and/or precipitation of lithium ions can be prevented.

BEST MODE FOR CARRYING OUT THE INVENTION

Hereinafter, a preferred embodiment of the present invention will be described in detail.

Various embodiments of the present invention may be embodied in many different forms and should not be construed as being limited to the example embodiments set forth herein. Rather, these example embodiments of the disclosure are provided so that this disclosure will be thorough and complete and will convey inventive concepts of the disclosure to those skilled in the art.

In the accompanying drawings, sizes or thicknesses of various components are exaggerated for brevity and clarity. Like numbers refer to like elements throughout. As used herein, the term "and/or" includes any and all combinations of one or more of the associated listed items.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprise" and/or "comprising," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another.

Hereinafter, a secondary battery according to an embodiment of the present invention will be described.

Figure 1:
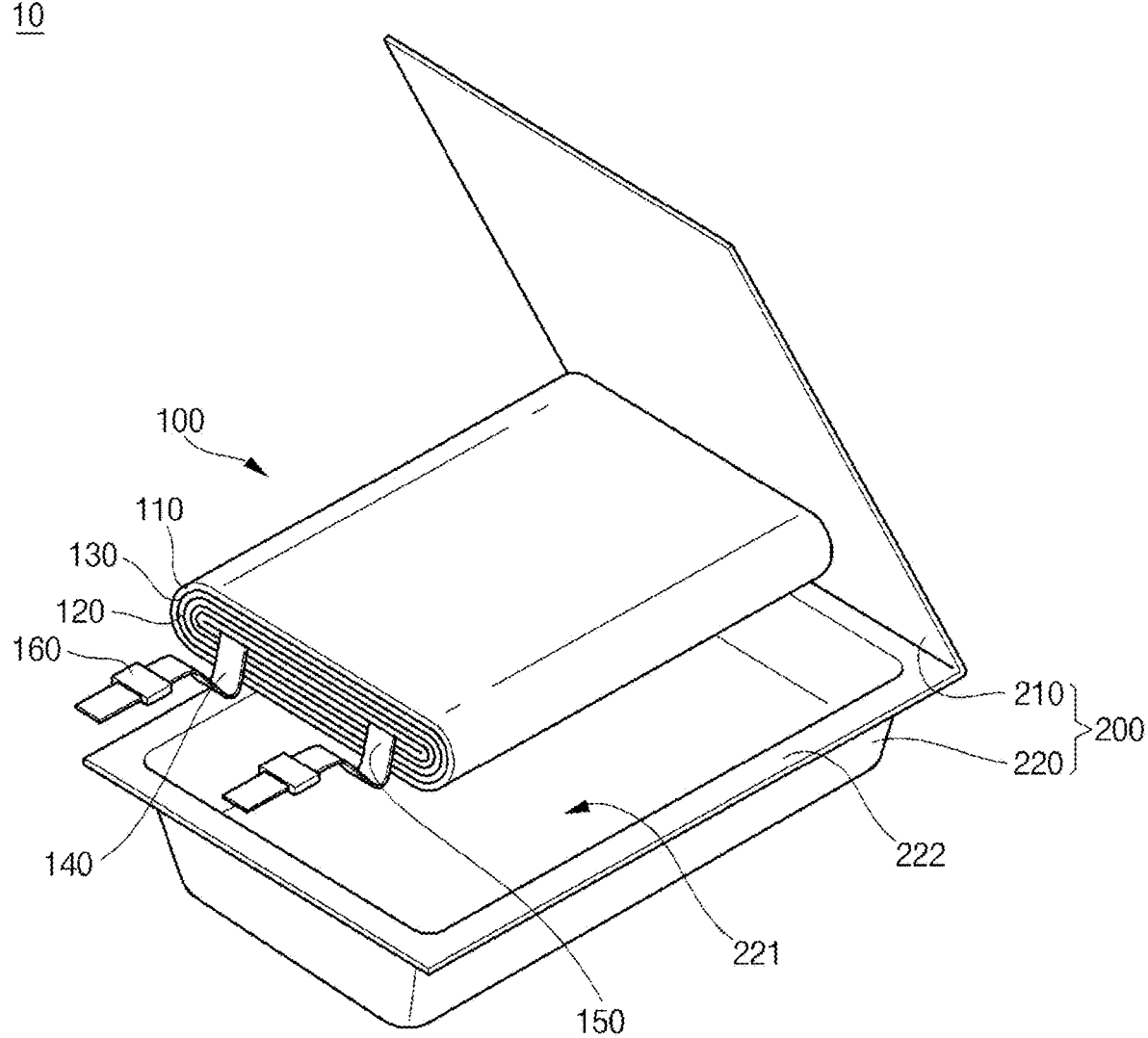
FIG. 1 is a perspective view of a secondary battery according to an embodiment of the present invention.
Figure 2:
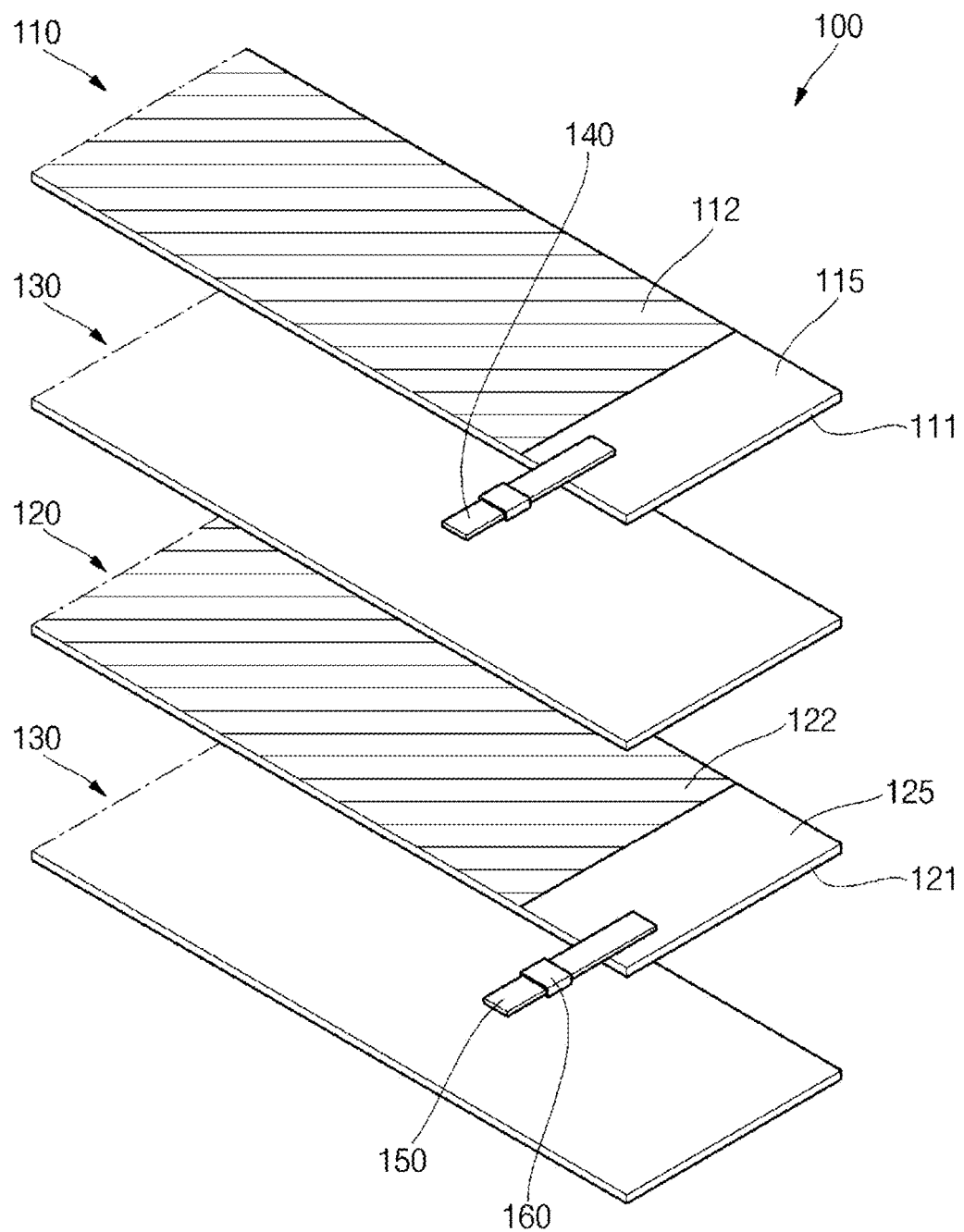
FIG. 2 is an exploded perspective view of an electrode assembly in the secondary battery according to an embodiment of the present invention.

FIG. 1 is a perspective view of a secondary battery according to an embodiment of the present invention. FIG. 2 is an exploded perspective view of an electrode assembly in the secondary battery according to an embodiment of the present invention.

Referring to FIGS. 1 and 2, the secondary battery 10 according to an embodiment of the present invention may include an electrode assembly 100 and a case 200 for receiving the electrode assembly 100.

The electrode assembly 100 is formed by stacking or winding a first electrode plate 110, a second electrode plate 120 and a separator 130 interposed therebetween. That is to say, the electrode assembly 110 may be formed by stacking the first and second electrode plates 110 and 120 and the separator 130, as illustrated in FIG. 2, and winding the stacked structure. The wound electrode assembly 110 is received in the case 200. Meanwhile, the first electrode plate 110 may be a negative electrode and the second electrode plate 120 may be a positive electrode, or vice versa.

The first electrode plate 110 includes a first electrode collector 111, a coating region 112 formed on at least one surface of the first electrode collector 111, and a first electrode non-coating portion 115 where the coating region 112 is not formed. Here, the coating region 112 may include a carbon coating layer 113 and a first electrode active material layer 114, which will later be described. The carbon coating layer 113 may be interposed between the first electrode collector 111 and the first electrode active material layer 114 to reduce interfacial resistance therebetween and to increase conductivity. Therefore, the carbon coating layer 113 may reduce internal resistance of the secondary battery and may increase charging/discharging cycle life.

When the first electrode plate 110 is a negative electrode, the first electrode collector 111 may include a conductive metal thin plate made of, for example, but not limited to, copper (Cu) or nickel (Ni) foil. The carbon coating layer 113 may include one or more carbon-based material selected from the group consisting of, for example, but not limited to, graphite, carbon black, acetylene black, Ketjen black, channel black, furnace black, lamp black, summer black, carbon fiber and fluorocarbon. In addition, the first electrode active material layer 114 may be formed using, for example, but not limited to, carbon-based material, Si, Sn, tin oxide, tin alloy complex, transition metal oxide, lithium metal nitride or metal oxide. However, the present invention does not limit the material of the first electrode plate 110 to those disclosed herein, as described above.

A configuration of the coating region 112 will later be described in more detail.

A first electrode tab 140 is formed in the first electrode non-coating portion 115 of the first electrode plate 110, where the coating region 112 is not formed. One end of the first electrode tab 140 is electrically connected to the first electrode non-coating portion 115, and the other end thereof is drawn to the outside of the case 200. Meanwhile, an insulation film 160 for insulation is attached to a region of the first electrode tab 140, which contacts the case 200.

The second electrode plate 120 includes a second electrode collector 121, a second electrode active material layer 122 formed on at least one surface of the second electrode collector 121, and a second electrode non-coating portion 125 where the second electrode active material layer 122 is not formed.

When the second electrode plate 120 is a positive electrode, the second electrode collector 121 may include a highly conductive metal thin plate made of, for example, but not limited to, aluminum foil. In addition, the second electrode active material layer 122 may include, for example, but not limited to, a chalcogenide compound including, for example, a composite metal oxide, such as LiCoO2, LiMn2O4, LiNiO2, or LiNiMnO2. However, the present invention does not limit the material of the second electrode plate 120 to those disclosed herein, as described above.

A second electrode tab 150 is formed in the second electrode non-coating portion 125 of the second electrode plate 120, where the second electrode active material layer 122 is not formed. One end of the second electrode tab 150 is electrically connected to the second electrode non-coating portion 125, and the other end thereof is drawn to the outside of the case 200. Meanwhile, the insulation film 160 for insulation is attached to a region of the second electrode tab 150, which contacts the case 200 of the first electrode tab 140.

The separator 130 is interposed between the first electrode plate 110 and the second electrode plate 120 to prevent electrical short circuits from occurring therebetween. In addition, the separator 130 may be formed of a porous layer to allow lithium ions to move between the first electrode plate 110 and the second electrode plate 120. The separator 130 may be made, for example, of polyethylene, polypropylene, or a copolymer of polypropylene and polyethylene, but the present invention does not limit the material of the separator 130 to those disclosed herein. To prevent electrical short circuits from occurring between the first electrode plate 110 and the second electrode plate 120, the separator 130 may have a larger width than the first and second electrode plates 110 and 120. In some cases, the separator 130 may be an organic and/or inorganic solid electrolyte itself.

The insulation film 160 electrically insulates each of the first and second electrode tabs 140 and 150 and the case 200 from each other. The insulation film 160 may be made of, for example, polyphenylene sulfide (PPS), polyimide (PI) or polypropylene (PP), but the present invention does not limit the material of the insulation film 160 to those disclosed herein.

An electrolyte solution (not illustrated) with the electrode assembly 100 may be received in the case 200. The electrolyte solution may serve as a movement medium of lithium ions generated by an electrochemical reaction taking place between the positive and negative electrodes of the secondary battery 100 during charging/discharging, and may include a non-aqueous organic solution that is a mixture of lithium salt and high-purity organic solvent. In addition, the electrolyte solution may be a polymer based on a polymeric electrolyte. As described above, when the organic and/or inorganic solid electrolyte is used, the electrolyte solution may not be provided.

The case 200 consists of an upper case 210 and a lower case 220, which are formed by bending a rectangular pouch layer formed in a single body at its center in a lengthwise direction. A groove 221, which is formed to receive the electrode assembly 100 and the electrolyte solution by, for example, a pressing step, and a sealing part 222 for being sealed with the upper case 210, are formed in the lower case 220.

Meanwhile, the embodiment of the present invention discloses that the secondary battery 10 is configured such that the electrode assembly 100 is received in the pouch-type case 200, but aspects of the present invention are not limited thereto. That is to say, the secondary battery 10 may be a prismatic battery or a cylindrical battery, rather than the pouch-type battery.

Figure 3:
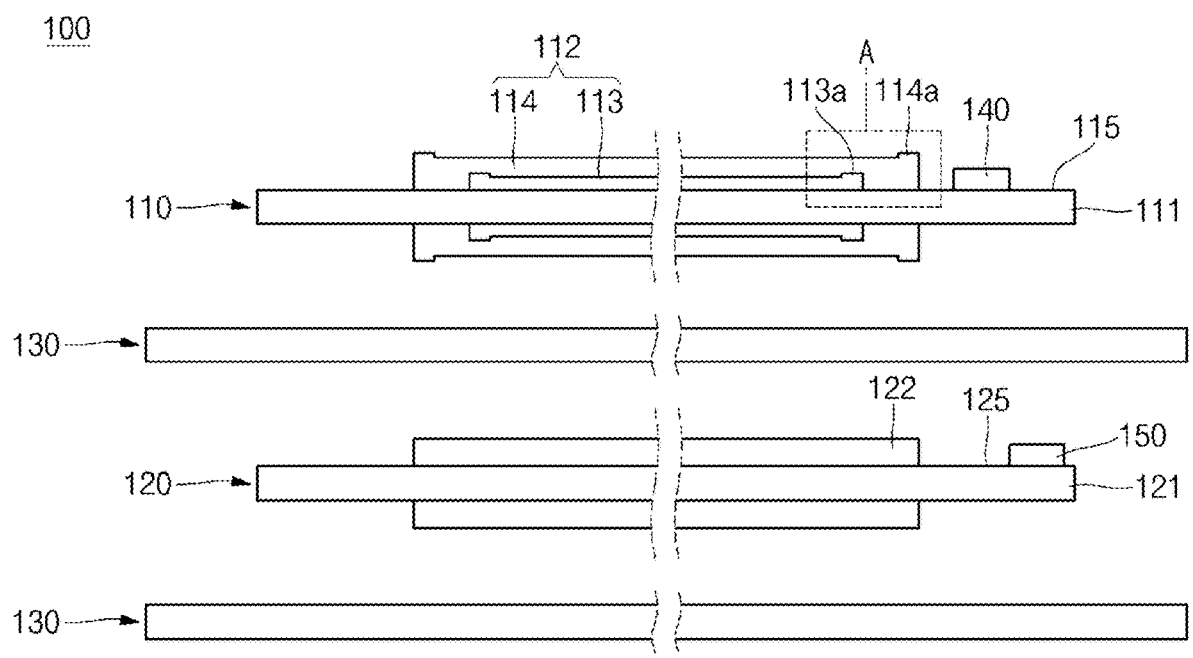
FIG. 3 is a cross-sectional view of the electrode assembly illustrated in FIG. 2.
Figure 4:
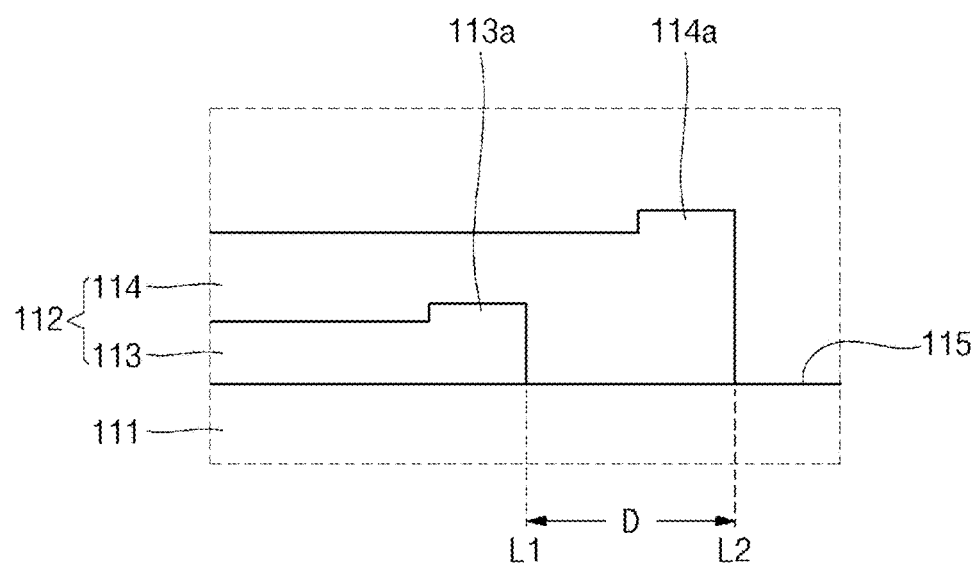
FIG. 4 is an enlarged cross-sectional view of a portion A of FIG. 3.

FIG. 3 is a cross-sectional view of the electrode assembly illustrated in FIG. 2. FIG. 4 is an enlarged cross-sectional view of a portion A of FIG. 3. For brevity and clarity, thicknesses and lengths in the electrode assembly illustrated in FIGS. 3 and 4 may be exaggerated or reduced.

Referring to FIGS. 3 and 4, the coating region 112 is formed on both surfaces of the first electrode collector 111. The coating region 112 includes the carbon coating layer 113 and the first electrode active material layer 114. As illustrated, the coating region 112 may be formed on both surfaces of the first electrode collector 111. In some cases, the coating region 112 may be formed on only one selected from both surfaces of the first electrode collector 111.

The carbon coating layer 113 is formed to cover at least a portion of the first electrode collector 111. A first protrusion 113a that is relatively thick in a thickness direction exists at opposite ends of the carbon coating layer 113. That is to say, the first protrusion 113a exists at a leading edge part and a trailing edge part, which are coated with the carbon coating layer 113, to protrude more thickly than other coating regions, except for the leading edge part and the trailing edge part.

The first protrusion 113a is inevitably formed in the course of forming the carbon coating layer 113. That is to say, when slurry for forming the carbon coating layer 113 is coated on the first electrode collector 111, rising of the slurry may occur to the leading edge part (i.e., a coating start portion) and the trailing edge part (i.e., a coating end portion) due to characteristics of coating process. That is to say, the reason for the rising of the slurry is that the coating process is nonuniformly performed at the leading edge part and the trailing edge part of the carbon coating layer 113, which is attributed to characteristics of the slurry and coating machine employed. As such, the first protrusion 113a exists at the leading edge part and the trailing edge part of the carbon coating layer 113 due to the rising of the slurry.

The first electrode active material layer 114 is formed to cover at least a portion of the first electrode collector 111. In addition, the first electrode active material layer 114 is formed to cover at least a portion of the carbon coating layer 113 as well. A second protrusion 114a exists at opposite ends of the first electrode active material layer 114. That is to say, the second protrusion 114a is formed at a leading edge part and a trailing edge part, which are coated with the first electrode active material layer 114, the second protrusion 114a protruded more thickly than other coating regions, except for the leading edge part and the trailing edge part.

The second protrusion 114a is inevitably formed in the coating process of the first electrode active material layer 114. That is to say, like the first protrusion 113a, the second protrusion 114a is also formed because slurry coating is nonuniformly performed at the leading edge part and the trailing edge part due to characteristics of coating process.

Meanwhile, the end of the carbon coating layer 113 and the end of the first electrode active material layer 114 may be in different positions. That is to say, in an embodiment of the present invention, the end of the first electrode active material layer 114 is extended longer than the end of the carbon coating layer 113. In other words, the first electrode active material layer 114 is formed longer than the carbon coating layer 113. Therefore, the first electrode active material layer 114 may be formed to entirely cover the carbon coating layer 113. In addition, the carbon coating layer 113 is not exposed to the outside by the first electrode active material layer 114.

Specifically, as illustrated in FIG. 4, the end of the first electrode active material layer 114 is spaced a preset distance D apart from the end of the carbon coating layer 113. In addition, the distance D is set to prevent the first protrusion 113a and the second protrusion 114a from overlapping each other. Therefore, the second protrusion 114a is positioned between an extension line L1 of the end of the carbon coating layer 113 and an extension line L2 of the end of the first electrode active material layer 114. In addition, the second protrusion 114a is preferably positioned at a region spaced apart from the extension line L1 of the end of the carbon coating layer 113.

Meanwhile, the distance D is preferably set to be in the range from 1 mm to 10 mm. Here, since the end of the carbon coating layer 113 and the end of the first electrode active material layer 114 may be in different positions, the distance D will not be zero (0). More preferably, the distance D may be set to be in the range from 2.5 mm to 5 mm. If the distance D is less than 2.5 mm, the first and second protrusions 113a and 114a may overlap each other, which is not desirable. If the distance D is greater than 5 mm, a difference between lengths of the carbon coating layer 113 and the first electrode active material layer 114 may become unnecessarily increased, which is not desirable, either.

In the embodiment of the present invention, the end of the carbon coating layer 113 and the end of the first electrode active material layer 114 are made to be in different positions, thereby preventing the first protrusion 113a and the second protrusion 114a from overlapping each other. Therefore, it is possible to prevent the safety of the secondary battery from being impaired due to overlapping of the first and second protrusions 113a and 114a.

That is to say, when the end of the carbon coating layer 113 and the end of the first electrode active material layer 114 are positioned on the same line, the first and second protrusions 113a and 114a may overlap each other, making the secondary battery vulnerable to damages or defects. For example, during the pressing step of the first electrode plate 110, active material delamination may occur to the relatively thick overlapping area of the first and second protrusions 113a and 114a. In addition, during charging/discharging of the secondary battery 10, movement of lithium ions may not be facilitated at the relatively thick overlapping area of the first and second protrusions 113a and 114a, resulting in precipitation of the lithium ions. In particular, the precipitation of the lithium ions may cause the lithium ions to pass through neighboring first and second electrode plates 110 and 120 or a neighboring separator 130, resulting in ignition of the secondary battery 10.

In the embodiment of the present invention, the coating region 112 is more uniformly formed by forming the first and second protrusions 113a and 114a so as not to overlap each other, thereby. Therefore, active material delamination due to overlapping of the first and second protrusions 113a and 114a can be suppressed, thereby improving the processing reliability. In addition, precipitation of lithium ion can be eliminated, thereby reducing defects of the secondary battery 10 and improving the safety of the secondary battery 10.

While the embodiment of the present invention illustrates that the carbon coating layer 113 is formed only on the first electrode plate 110, the carbon coating layer 113 may also be formed on the second electrode plate 120 as well. That is to say, the carbon coating layer 113 may be interposed between the second electrode collector 121 and the second electrode active material layer 122 of the second electrode plate 120.

Hereinafter, a secondary battery according to another embodiment of the present invention will be described.

Figure 5:
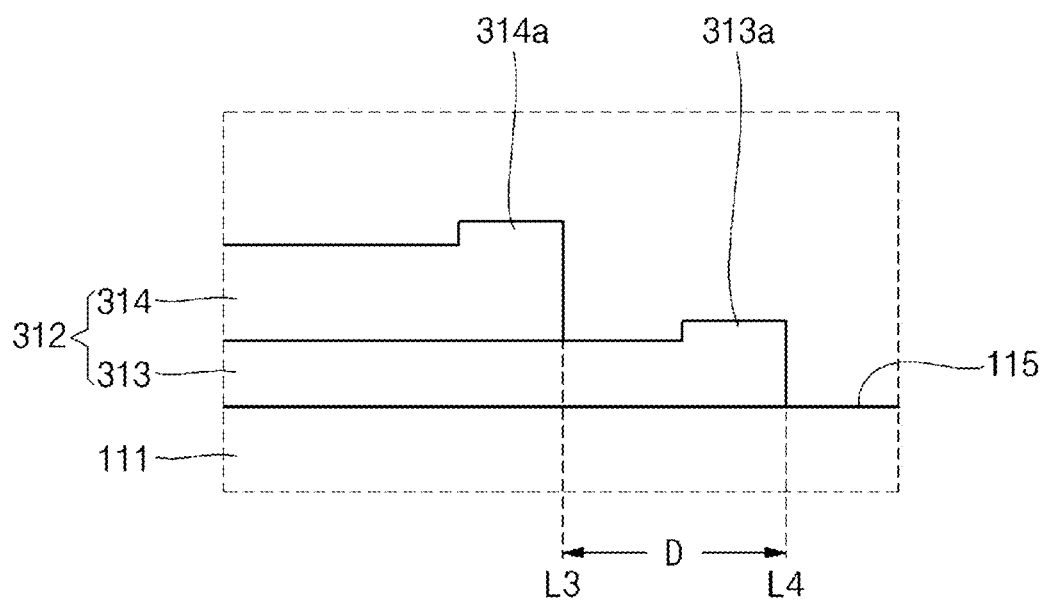
FIG. 5 is a cross-sectional view of a region corresponding to FIG. 4 in a secondary battery according to another embodiment of the present invention.

FIG. 5 is a cross-sectional view of a region corresponding to FIG. 4 in a secondary battery according to another embodiment of the present invention. Since the secondary battery according to another embodiment of the present invention is substantially the same with the secondary battery 10 according to the previous embodiment, except for a configuration of a coating region 312, repeated explanation will not be given.

Referring to FIG. 5, a coating region 312 is formed on at least one surface of the first electrode collector (111 of FIG. 3). Here, the coating region 312 includes a carbon coating layer 313 and a first electrode active material layer 314. In addition, the carbon coating layer 313 and the first electrode active material layer 314 include a first protrusion 313a and a second protrusion 314a formed at their ends, respectively.

The carbon coating layer 313 and the first electrode active material layer 314 may be formed such that the end of the carbon coating layer 313 and the end of the first electrode active material layer 314 are in different positions. That is to say, in another embodiment of the present invention, the carbon coating layer 313 is formed such that its end is extended longer than the end of the first electrode active material layer 314. In other words, the carbon coating layer 313 is formed longer than the first electrode active material layer 314. Therefore, the first electrode active material layer 314 covers at least a portion of the carbon coating layer 313.

In addition, the end of the carbon coating layer 313 is exposed to the outside by the first electrode active material layer 314.

Specifically, the end of the carbon coating layer 313 and the end of the first electrode active material layer 314 are spaced a preset distance D apart from each other. In addition, the distance D is set such that the first protrusion 313a and the second protrusion 314a do not overlap each other. Therefore, the first protrusion 313a is positioned between an extension line L3 of the end of the first electrode active material layer 314 and an extension line L4 of the end of the carbon coating layer 313. In addition, the first protrusion 313a is preferably positioned at a region spaced apart from the extension line L3 of the end of the first electrode active material layer 314.

Meanwhile, the distance D may be set to be in the range from 1 mm to 10 mm. Of course, since the end of the first electrode active material layer 314 and the end of the carbon coating layer 313 are in different positions, the distance D may not be zero (0). Preferably, the distance D may be set to be in the range from 2.5 mm to 5 mm. If the distance D is less than 2.5 mm, the first and second protrusions 313a and 314a may overlap each other, which is not desirable. In addition, if the distance D is greater than 5 mm, a difference between lengths of the carbon coating layer 313 and the first electrode active material layer 314 may become unnecessarily increased, which is not desirable, either.

In another embodiment of the present invention, the carbon coating layer 313 and the first electrode active material layer 314 may be formed such that the end of the carbon coating layer 313 and the end of the first electrode active material layer 314 are in different positions, thereby preventing the first protrusion 313a and the second protrusion 314a from overlapping each other. Therefore, the delamination of the electrode active material and/or precipitation of lithium ions can be prevented, thereby suppressing defects of the secondary battery and improving the safety of the secondary battery.

Meanwhile, the configuration of the coating region 312 according to the current embodiment and the configuration of the coating region 112 according to the previous embodiment can be both applied in combination. That is to say, a combination of different configurations can be applied to coating regions formed at both ends of the first electrode plate 110 such that the configuration of the coating region 112 according to the previous embodiment is applied to one end coating region and the configuration of the coating region 312 according to the current embodiment is applied to the other end coating region.

In addition, although not illustrated, the carbon coating layer may also be formed on a second electrode plate. Here, the carbon coating layer and a second electrode active material layer formed on the second electrode plate may be configured by applying the configuration of the coating region 112 according to the previous embodiment of the present invention alone, by applying the configuration of the coating region 312 according to the current embodiment of the present invention alone, or by applying the configurations of the coating regions 212 and 312 according to both embodiments in combination.

Figure 6:
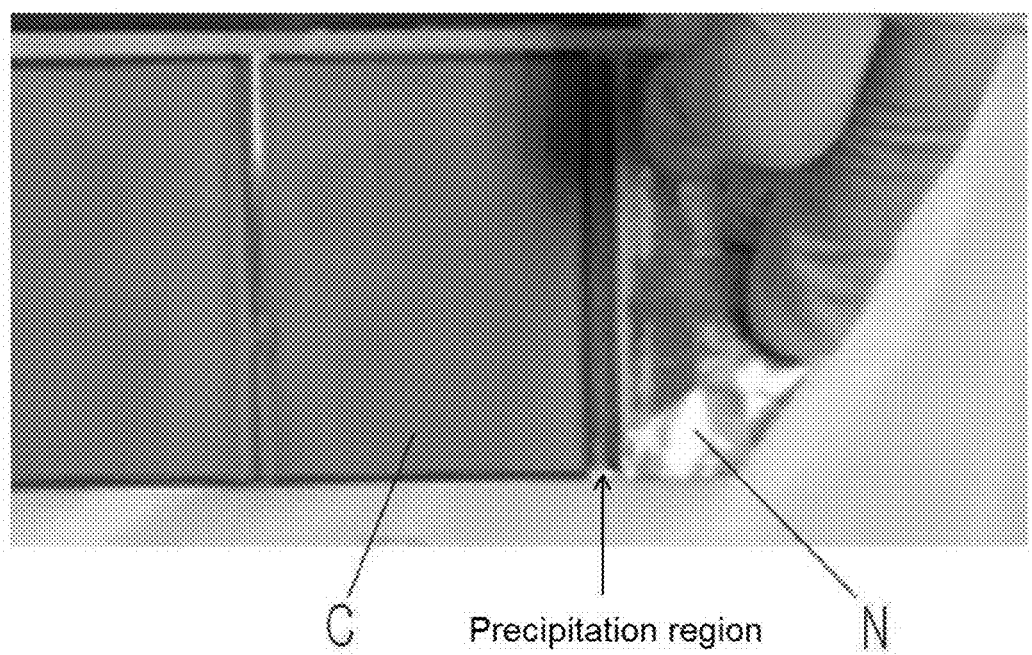
FIGS. 6 and 7 are photographs for comparison of a secondary battery in which ends of two coating layers formed on electrode plates are on the same line and a secondary battery in which ends of two coating layers are in different positions.
Figure 7:
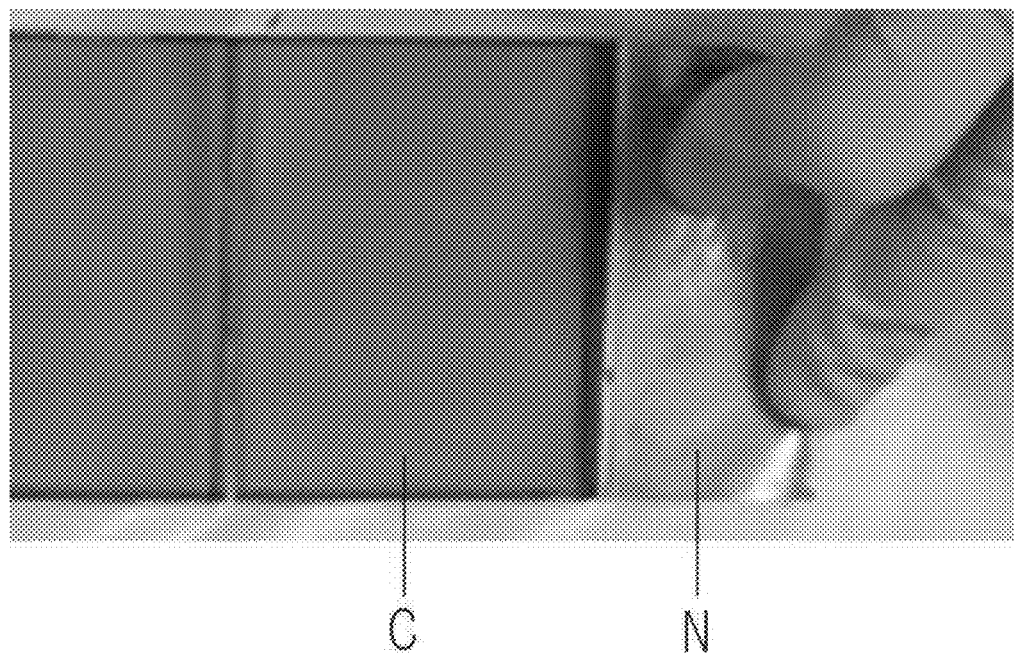

FIGS. 6 and 7 are photographs for comparison of a secondary battery in which ends of two coating layers formed on electrode plates are on the same line and a secondary battery in which ends of two coating layers are in different positions.

Table 1 shows observation results of active material delamination and lithium precipitation depending on the distance D between the end of the carbon coating layer and the end of the first electrode active material layer. Here, assuming that the origin O is the end of the carbon coating layer, the distance D indicates a position of the end of the first electrode active material layer spaced apart from the origin O. In addition, the (+) sign means that the end of the first electrode active material layer is extended longer than the end of the carbon coating layer, and the (−) sign means that the end of the first electrode active material layer is extended to be shorter than the end of the carbon coating layer. That is to say, the configuration of the coating region 112 disclosed in the previous embodiment is applied in Examples 1 and 2, and the configuration of the coating region 312 disclosed in the current embodiment is applied in Examples 3 and 4.

As to the active material delamination in Table 1, the observation results are obtained by determining whether the amount of the delaminated active material stuck on a press roll during a pressing step performed after forming a coating region on a first electrode plate exceeds a predetermined level.

As to the lithium precipitation in Table 1, the observation results are obtained by determining whether lithium is precipitated at a boundary region between the coating region and the first electrode non-coating portion after performing charging and discharging operations on an electrode assembly at a predetermined level and then disassembling the electrode assembly. Here, the observation result of Comparative Example 1 is illustrated in FIG. 6, and the observation result of Example 1 is illustrated in FIG. 7.

TABLE 1

|  | D (mm) | Delamination of active material | Precipitation of lithium |
| --- | --- | --- | --- |
| Comparative Example 1 | 0 | ◯ | ◯ |
| Example 1 | +5 | X | X |
| Example 2 | +3 | X | X |
| Example 3 | −3 | X | X |
| Example 4 | −5 | X | X |

In Comparative Example 1, when the end of the carbon coating layer and the end of the first electrode active material layer are positioned on the same line (D=0 mm), occurrences of active material delamination and lithium precipitation were observed. Specifically, referring to FIG. 6, it was confirmed that a precipitation region existed at a boundary between the coating region (C) and the non-coating portion (N). That is to say, it is understood that the protrusion of the carbon coating layer and the protrusion of the first electrode active material layer overlap each other, a rising phenomenon occurring at the end of the coating region is maximized, consequently resulting in active material delamination and lithium precipitation.

However, when the end of the carbon coating layer and the end of the first electrode active material layer are spaced the distance D apart from each other (D=+5 mm) (Example 1), occurrences of active material delamination and lithium precipitation were not observed. Specifically, referring to FIG. 7, it was confirmed that only a boundary portion between the coating region (C) and the non-coating portion (N) was observed but lithium precipitation was not observed. That is to say, it is understood that the protrusion of the carbon coating layer and the protrusion of the first electrode active material layer did not overlap each other, and the coating region C was more uniformly formed, consequently preventing the active material delamination and lithium precipitation from occurring due to overlapping of the protrusions of the carbon coating layer and the first electrode active material layer.

In addition, when the distances D between the end of the carbon coating layer and the end of the first electrode active material layer are +3 mm, −3 mm and −5 mm, respectively (Examples 2, 3 and 4), it was confirmed that occurrences of active material delamination and lithium precipitation were not observed, as indicated in Table 1.

That is to say, in the secondary battery according to the present invention, the end of the carbon coating layer and the end of the first electrode active material layer are in different positions in the first electrode plate and the respective protrusions do not overlap each other, thereby improving the safety of the secondary battery.

Although the foregoing embodiments have been described to practice the secondary battery of the present invention, these embodiments are set forth for illustrative purposes and do not serve to limit the invention. Those skilled in the art will readily appreciate that many modifications and variations can be made, without departing from the spirit and scope of the invention as defined in the appended claims, and such modifications and variations are encompassed within the scope and spirit of the present invention.

EXPLANATION OF REFERENCE NUMERALS

| 10: Secondary battery | 100: Electrode assembly |
| --- | --- |
| 110: First electrode plate | 111: First electrode collector |
| 112: Coating region | 113: Carbon coating layer |
| 113a: First protrusion | 114: First electrode active material layer |
| 114a: Second protrusion | 115: First electrode non-coating portion |
| 120: Second electrode plate | 130: Separator |
| 140, 150: First and second electrode tabs | |
| 200: Case | 312: Coating region |
| 313: Carbon coating layer | 313a: First protrusion |
| 314: First electrode active material layer | |
| 314a: Second protrusion | |

The invention claimed is:

1. A secondary battery comprising:
   an electrode assembly including a first electrode plate, a second electrode plate, and a separator interposed therebetween; and
   a case for receiving the electrode assembly,
   wherein the first electrode plate comprises:
   a first electrode collector;
   a carbon coating layer formed on at least one surface of the first electrode collector; and
   a first electrode active material layer covering at least a portion of the carbon coating layer,
   wherein the carbon coating layer and the first electrode active material layer are formed such that an end of the carbon coating layer and an end of the first electrode active material layer are in different positions, and a protrusion is formed on at least one of the end of the carbon coating layer and the end of the first electrode active material layer, and
   wherein the first electrode active material layer is formed to cover at least a portion of the first electrode collector.

2. The secondary battery of claim 1, wherein the end of the carbon coating layer and the end of the first electrode active material layer are spaced a distance apart from each other.

3. The secondary battery of claim 2, wherein the distance is in a range from 1 mm to 10 mm.

4. A secondary battery comprising:
an electrode assembly including a first electrode plate, a second electrode plate, and a separator interposed therebetween; and
a case for receiving the electrode assembly,
wherein the first electrode plate comprises:
a first electrode collector;
a carbon coating layer formed on at least one surface of the first electrode collector; and
a first electrode active material layer covering at least a portion of the carbon coating layer,
wherein the carbon coating layer and the first electrode active material layer are formed such that an end of the carbon coating layer and an end of the first electrode active material layer are in different positions, and a protrusion is formed on at least one of the end of the carbon coating layer and the end of the first electrode active material layer, and
wherein the protrusion includes a first protrusion protruded from the end of the carbon coating layer in a thickness direction of the carbon coating layer, and a second protrusion protruded from the end of the first electrode active material layer in a thickness direction of the first electrode active material layer.

5. The secondary battery of claim 4, wherein the first electrode active material layer is formed such that the end thereof is extended longer than the end of the carbon coating layer.

6. The secondary battery of claim 5, wherein the second protrusion is positioned between the end of the carbon coating layer and the end of the first electrode active material layer.

7. The secondary battery of claim 4, wherein the carbon coating layer is formed such that the end thereof is extended longer than the end of the first electrode active material layer.

8. The secondary battery of claim 7, wherein the first protrusion is positioned between the end of the first electrode active material layer and the end of the carbon coating layer.

* * * * *